United States Patent Office 3,512,292
Patented May 19, 1970

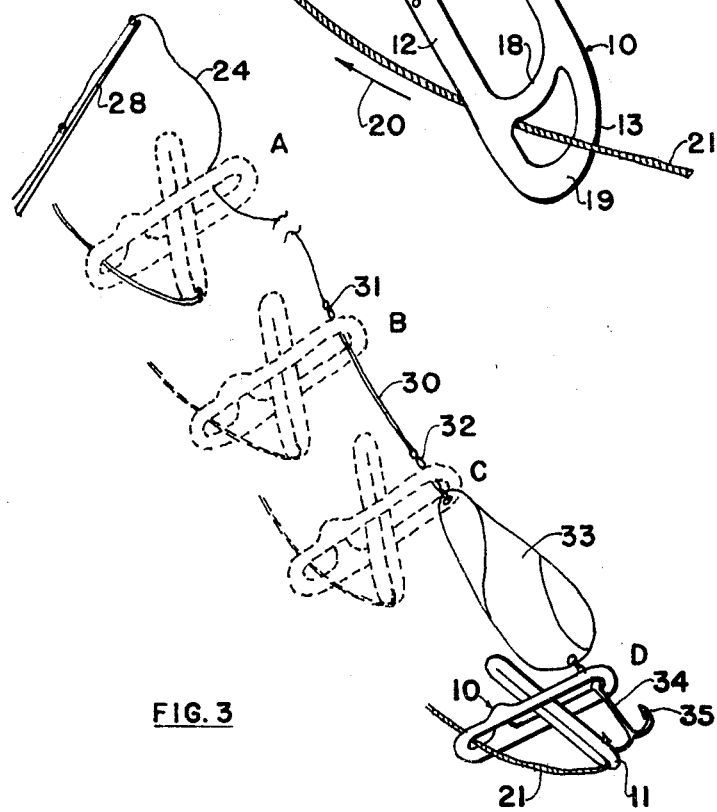

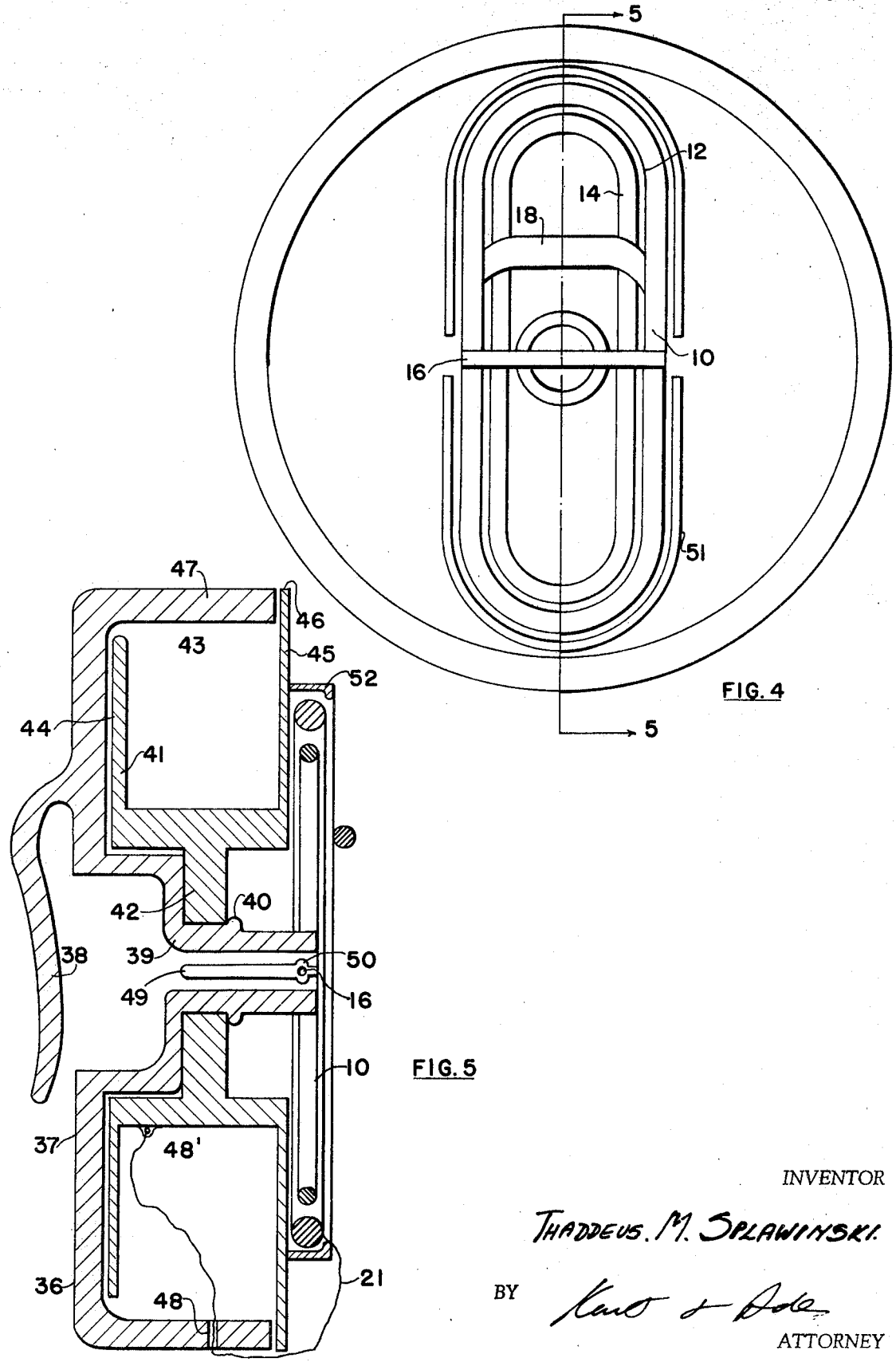

3,512,292
FISH BAIT RETRIEVER AND REEL ASSEMBLY
Thaddeus M. Splawinski, Saskatoon, Saskatchewan, Canada, assignor to Snagaway Tackle Ltd., Edmonton, Alberta, Canada
Filed Jan. 26, 1968, Ser. No. 700,946
Int. Cl. A01k 97/00
U.S. Cl. 43—17.2          9 Claims

ABSTRACT OF THE DISCLOSURE

The device is a holder and reel for fish bait retrievers and consists of a casing having a manually operable reel inside, which is automatic in assembly and disassembly. The retriever trips to the front of the reel and a line extends from the reel to the retriever. The reel may also be clipped to the belt of the user if desired.

My invention relates to new and useful improvements in fish bait retrievers and holders therefor.

It is well known that a relatively large amount of tackle is lost as a result of the bait snagging below the water either in rocks, logs, crevices or the like.

It is normal for the hook of the bait or the lure to jam, and due to the relatively light weight fishing line normally used, any attempt to pull the lure or hook free of the obstruction normally results in breakage of the line with the subsequent loss of the leader, the hook, and the lure or tackle, if used in association with the hook.

I have overcome these disadvantages by providing a looped type retriever which may be threaded onto the line, fed downwardly until the lure or hook is reached, whereupon the tackle may be clamped by pulling on the retriever line and strain placed directly upon the tackle by means of the retriever line so that the hook is sprung free from obstruction or broken from the lure which may then be recovered, it being understood that the replacement of the hook element is a relatively simple and inexpensive task compared to the replacement of the entire lure or bait being used.

The principal object and essence of my invention is to provide a device of the character herewithin described which may be engaged upon a conventional fishing line, and then permitted to descend the line freely until the bait is reached whereupon the bait may be clamped by the device for retrieval purposes.

Another object of the invention is to provide a device of the character herewithin described which includes means which prevents the device from clamping on the fishing line per se thus eliminating the possibility of strain being placed upon the line prior to the tackle being reached.

Another object of the invention is to provide a device of the character herewithin described which can be clamped upon the leader, the bait, or the hook element.

Still another object of the invention is to provide a device of the character herewithin described which includes a novel holder adapted to be clipped to the fisherman's belt thus enabling the retriever to be stored with the line on a reel contained within the holder.

Yet another object of the invention is to provide a device of the character herewithin described which is simple in construction, economical in manufacture, and otherwise well suited to the purpose for which it is designed.

With the foregoing in view, and all those objects, purposes, or advantages which may become apparent from consideration of this disclosure and specification, the present invention consists of the inventive concept embodied in the method, process, construction, arrangement of parts, or new use of the same, as herein particularly exemplified in one or more specific embodiments of such concept, reference being had to the accompanying figures in which:

FIG. 1 is a plan view of my device.

FIG. 2 is an isometric view of the device showing same in the open position.

FIG. 3 is a composite view showing the device upon the line, around the leader, adjacent the bait, and around the hook element.

FIG. 4 is a front view of the reel with the retriever therein.

FIG. 5 is a vertical section of the reel along the lines 5—5 of FIG. 4.

In the drawings like characters of reference indicate corresponding parts in the different figures.

Proceeding therefore to describe my invention in detail, the device comprises an outer loop component collectively designated 10 and an inner loop component collectively designated 11.

The outer loop component is of an oblong looped configuration and includes a pair of spaced and parallel longitudinally extending members 12, the ends of said members being spanned by semi-circularly curved ends 13 as shown in FIG. 1 of the drawing.

The inner loop component 11 is similarly constructed but of smaller dimensions, the longitudinal members being identified by the reference character 14 and the curved end members by the reference character 15.

The component 11 is pivotally secured within the components 12 by means of pivot pin or cross bar 16 passing clear through the longitudinal member 14 and engaging within the longitudinal member 12 of the outer component 10. The pivotal connection is such that when in the closed position shown in FIG. 1, the inner component 11 is maintained in spaced apart relationship from the outer component 10.

The pivot 16 is engaged through the inner component 11 in a position spaced from the center of gravity of the inner component so that when the outer component is held horizontally, one end 17 of the inner component swings towards the vertical position.

A slightly curved bar 18 spans the longitudinal members 12 of the outer component 11 adjacent one end 19 thereof and this prevents the inner component from swinging in a direction opposite to arrow 20, beyond the closed or planar position shown in FIG. 1.

A relatively heavy weight retrieval line 21 is secured to the end 17 of the inner component and passes through the outer component between the cross bar 18 and the end 19 of the outer component as shown in FIG. 2.

The other end 22 of the outer component is provided with an open slot 23 to permit the engagement and disengagement of the device over the associated fishing line 24. This open slot is formed by cutting a slot 23' within the end 22, extending from the end 22 to a location identified by the reference character 23, said slot being on the horizontal plane of the outer component and substantially centrally located within the thickness of the stock from which the outer component is made.

A transverse slot is then made, designated 26, at right angles to the slot 23 downwardly to meet the slot 23 on one side member 12 and a similar slot 27 on the other side member 12' but upon the opposite side to the first mentioned slot 26 thus forming an open ended slot which permits the line to be threaded through the slot so that the outer component is threaded over the line 24 as shown in FIG. 3. At the same time inadvertent displacement of the device from the line 24 is prevented by the serpentine nature of the open slot 23.

In operation, when the bait is snagged, the device is threaded upon the line 24 as shown in position A in FIG. 3. The retrieving line 21 is held by the operator and by raising the fishing rod 28, the device slides down the line 24 by gravity, the inner component swinging towards the vertical position so that the device is in the open position shown in FIGS. 2 and 3.

The retrieving device may be used in any of the positions shown at B, C or D in FIG. 3, the principle of operation being similar in all cases.

When the operator believes that the device has reached either of the positions B, C or D, the retrieving line 21 is pulled thus closing the inner component against the stop bar 18. This clamps the device to the bait in whatever position it is located. However, the space 29 between the end 15 of the inner component and the end 22 of the outer component is such that the line 24 will slide freely therethrough thus preventing inadvertent clamping of the device upon the line 24.

If the device is in position B when the clamping action is initiated, the device will slide along the leader 30 until it reaches the swivel connection 31 which is too large to pass through the gap 29 so that strain can be taken at this point. By the same token, the device will clamp around the swivel assembly 32 between the leader and the bait 33 or around the hook element 34 below the bait 33 depending upon the location of the device.

Irrespective of the position, continual pulling on the retriever line will apply pressure to the hook element 34 until the hook barb 35 either breaks or is sprung from the snagging objects.

FIGS. 4 and 5 show the novel reel adapted for use with the retriever.

It consists of a substantially cylindrical casing 36 having a closed rear surface 37 with a pair of belt engaging prongs or hooks 38 depending downwardly from the rear face thereof.

A bearing post or shoulder 39 is formed integrally with the casing and extends forwardly thereof, said bearing having a bead 40 formed thereon.

A reel 41 includes the hub 42 together with a line containing annular channel 43 defined by the rear circular plate 44 of the reel and the front circular plate 45

The hub engages over the bearing shoulder 39 and snaps into position over the bead 40 thereby mounting the reel for rotation upon the bearing shoulder 39. The resiliency of the plastic permits the hub to pass over the bead 40.

The periphery 46 of the front plate 45 of the reel extends just level wtih the exterior cylindrical surface 47 of the casing and prevents line 24 from disengaging from the reel except through the line aperture 48 formed in the wall 47, thereof. Means 48' can be used to anchor the end of line 24 to the reel 41. Alternatively, the end of the line can be tied around the hub of the reel, friction being sufficient to permit winding to take place.

The aforementioned bearing shoulder 39 is hollow and is provided with a pair of opposed slots 49, said slots having notches 50 extending therefrom. A retriever casing or shroud 51 is formed upon the front plate 45 extending radially from the hub and the shell 52 of this casing extends outwardly and as shown in FIG. 5, to receive the retriever 10 nestable therein. The retriever is held in position by the cross bar 16 of the retriever engaging the aforementioned slots 49 and snapping into the recesses 50 as illustrated in FIG. 5.

In use, the retriever is disengaged from the casing 51 and the line exiting through the aperture 48 unreels as the device is used. After use, the line is fed back through the aperture 48 and the reel is rotated manually by means of the front disc 45 until the line is fully rewound whereupon the retriever may be snapped into position within the holder.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. In combination with a fish bait retriever of the class described, a reel assembly and holder for said retriever, said assembly and holder including a substantially hollow casing, a bearing post formed, concentrically in said casing, a reel mounted for rotation on said bearing post, said casing having an aperture for a line to freely pass from said reel through said casing to said retriever and means on said casing detachably receiving said retriever, said retriever including a centrally located cross bar, said means on said casing to detachably receive said retriever including a slot formed in the outer end of said bearing post, said cross bar engaging said slot, and means associated with said slot to detachably hold said cross bar in position.

2. The device according to claim 1 which includes hook means on the rear of said casing to secure said casing to an associated support.

3. The device according to claim 1 in which said means associated with said slot includes recesses on the sides of said slot, said cross bar spreading the walls of said slot apart and engaging said recesses.

4. The device according to claim 3 which includes a retriever shroud extending in a direction normal to said reel and being secured thereto, said shroud receiving said retriever when being retained by said casing.

5. A reel assembly and holder for fish bait retrievers comprising in combination with said retriever, said retrievers having a cross bar thereon, said reel assembly and holder comprising a substantially hollow casing, said casing being open on one side, a bearing post formed concentrically in said casing, a reel mounted for rotation on said bearing post, said casing having an aperture for a line to freely pass from said reel through said casing to the said retriever and means on said casing to detachably receive said retriever, said reel including a substantially circular front face, with a periphery which extends at least to the outer periphery of said casing thereby substantially closing off said open side of said casing.

6. The device according to claim 5 in which said means on said casing to detachably receive the associated fish bait retriever includes a slot formed in the outer end of said bearing post, said slot receiving the cross bar of the associated retriever, and further means associated with said slot to detachably hold said cross bar in position.

7. The device according to claim 6 in which said further means includes recesses on the sides of said slot, said associated cross bar spreading the walls of said slot and engaging said recesses.

8. The device according to claim 7 which includes a retriever shroud secured to and extending from said front face in a direction normal thereto, said shroud adapted to receive said retriever when said retriever is retained by said casing.

9. The device according to claim 6 which includes retriever shroud secured to and extending from said front face in a direction normal thereto, said shroud adapted to receive said retriever when said retriever is retained by said casing.

References Cited

UNITED STATES PATENTS

| | | | |
|---|---|---|---|
| 2,586,170 | 2/1952 | Lawrenz | 43—17.2 |
| 3,243,911 | 4/1966 | Splawinski | 43—17.2 |
| 3,401,478 | 9/1968 | Lambert | 43—5 |

WARNER H. CAMP, Primary Examiner